US012496559B2

(12) United States Patent
Magnerius et al.

(10) Patent No.: US 12,496,559 B2
(45) Date of Patent: Dec. 16, 2025

(54) CARBONATOR WITH GUIDING ASSEMBLY

(71) Applicant: AARKE AB, Stockholm (SE)

(72) Inventors: Melker Magnerius, Stockholm (SE); Gustav Solberger, Stockholm (SE)

(73) Assignee: Aarke AB, Stockholm (SE)

( * ) Notice: Subject to any disclaimer, the term of this patent is extended or adjusted under 35 U.S.C. 154(b) by 317 days.

(21) Appl. No.: 18/254,034

(22) PCT Filed: Nov. 22, 2021

(86) PCT No.: PCT/EP2021/082487
§ 371 (c)(1),
(2) Date: May 23, 2023

(87) PCT Pub. No.: WO2022/106683
PCT Pub. Date: May 27, 2022

(65) Prior Publication Data
US 2024/0001314 A1   Jan. 4, 2024

(30) Foreign Application Priority Data
Nov. 23, 2020  (SE) .................... 2051363-6

(51) Int. Cl.
*B01F 23/23*  (2022.01)
*B01F 23/2361*  (2022.01)
(Continued)

(52) U.S. Cl.
CPC .. *B01F 23/2361* (2022.01); *B01F 23/237621* (2022.01); *B01F 33/5014* (2022.01);
(Continued)

(58) Field of Classification Search
CPC .......... B01F 23/2361; B01F 23/237621; B01F 33/5014; B01F 2101/14; B01F 23/236;
(Continued)

(56) References Cited

U.S. PATENT DOCUMENTS 1,496,611 A * 6/1924 Siegel ................... A47J 43/044
366/207
3,037,749 A * 6/1962 Stubler ................. A47J 43/044
366/207
(Continued)

FOREIGN PATENT DOCUMENTS

CN     119499912 A  *  2/2025  .......... B01F 27/2312
EP     1642637 A1      4/2006
(Continued)

OTHER PUBLICATIONS

Epo translation of WO2020148293 (Year: 2020).*
(Continued)

*Primary Examiner* — Stephen Hobson
(74) *Attorney, Agent, or Firm* — Knobbe, Martens, Olson & Bear, LLP

(57) ABSTRACT

A carbonator for carbonating a beverage in a beverage container. The carbonator comprises a stationary part, a movable part which is movable in respect of the stationary part and a guiding assembly for movably connecting the movable part and the stationary part. The guiding assembly comprises guide rod means and guide rod engagement means.

14 Claims, 7 Drawing Sheets

(51) Int. Cl.
*B01F 23/237* (2022.01)
*B01F 33/501* (2022.01)
*B01F 101/14* (2022.01)
*B67D 1/00* (2006.01)

(52) U.S. Cl.
CPC ........ *B01F 2101/14* (2022.01); *B67D 1/0057* (2013.01); *B67D 1/0072* (2013.01); *Y10S 261/07* (2013.01)

(58) Field of Classification Search
CPC ... B67D 1/0057; B67D 1/0072; Y10S 261/07; A23L 2/54
See application file for complete search history.

(56) References Cited

U.S. PATENT DOCUMENTS

| | | | | |
|---|---|---|---|---|
| 4,096,893 A | * | 6/1978 | Harvey, Jr. | A47J 31/407 99/302 R |
| 4,323,090 A | * | 4/1982 | Magi | B01F 23/2361 261/DIG. 7 |
| 4,342,710 A | * | 8/1982 | Adolfsson | B01F 23/2361 426/477 |
| 4,610,282 A | * | 9/1986 | Brooks | B01F 33/5014 426/477 |
| 4,822,175 A | * | 4/1989 | Barnard | B01F 35/60 366/601 |
| 4,889,432 A | * | 12/1989 | Patterson | A61C 5/64 366/139 |
| 7,975,988 B2 | * | 7/2011 | Thomson | B01F 23/2361 426/477 |
| 8,807,823 B2 | * | 8/2014 | Williams | A47J 43/0705 366/207 |
| 9,687,796 B2 | * | 6/2017 | Hoare | B01F 35/2112 |
| 2007/0257380 A1 | * | 11/2007 | Thomson | B67D 1/0072 261/64.5 |
| 2008/0279040 A1 | * | 11/2008 | Neilson | B08B 3/04 366/206 |
| 2012/0087203 A1 | * | 4/2012 | Williams | B01F 27/806 99/460 |
| 2015/0367296 A1 | * | 12/2015 | Cohen | B01F 23/2361 261/65 |
| 2016/0016133 A1 | * | 1/2016 | Merritt | B01F 35/186 366/242 |
| 2019/0275478 A1 | * | 9/2019 | Jersey | B01F 35/2115 |
| 2019/0374067 A1 | * | 12/2019 | Duffy | B01F 27/1152 |
| 2021/0007319 A1 | * | 1/2021 | Hellmers | A47J 43/044 |
| 2021/0094819 A1 | * | 4/2021 | Lundberg | B01F 27/1154 |
| 2024/0001313 A1 | * | 1/2024 | Magnerius | B01F 35/602 |
| 2024/0189782 A1 | * | 6/2024 | Magnerius | A23L 2/54 |
| 2025/0153995 A1 | * | 5/2025 | Woodcock | B67D 1/0069 |

FOREIGN PATENT DOCUMENTS

| | | | | |
|---|---|---|---|---|
| GB | 2077126 A | | 12/1981 | |
| JP | 2021159302 A | * | 10/2021 | |
| WO | WO 2018/089460 A1 | | 5/2018 | |
| WO | WO-2020148293 A2 | * | 7/2020 | ............... A23L 2/54 |
| WO | WO-2020148294 A1 | * | 7/2020 | ............... A23L 2/54 |

OTHER PUBLICATIONS

International Search Report for International Application No. PCT/EP2021/082487 dated Mar. 4, 2022.
Swedish Search Report for Swedish Patent Application No. 2051363-6 dated Jul. 22, 2021.

* cited by examiner

CARBONATOR WITH GUIDING ASSEMBLY

CROSS REFERENCE TO RELATED APPLICATION

This application is a U.S. National Phase Application of PCT International Application Number PCT/EP2021/082487, filed on Nov. 22, 2021, designating the United States of America and published in the English language, which claims priority to Sweden Provisional Application No. 2051363-6, filed on Nov. 23, 2020, each of which is hereby expressly incorporated by reference in its entirety for all purposes and forms a part of this specification.

TECHNICAL FIELD

The present disclosure generally pertains to carbonators for carbonating beverages, and more particularly to a carbonator of compact and sturdy design.

BACKGROUND ART

Carbonators are used for producing carbonated beverage, such as carbonated water. Carbonators for domestic use are typically designed to be placed free-standing on a table or kitchen countertop and are operated manually by a person. Such a carbonator, also known as a soda water machine, typically comprises a carbon dioxide cylinder that is connected to a nozzle that is inserted into a beverage bottle containing liquid. The carbonator further comprises an operating arrangement that allows the user to open a valve in the carbon dioxide cylinder to introduce carbon dioxide into the beverage bottle. The carbon dioxide dissolves in the liquid in the pressurised beverage bottle.

Prior art carbonators are marred with various drawbacks and problems, such as a bulky design and poor handling. For example, moving parts are often suspended by means of flimsy slidingly interacting profiles of relatively large cross-section.

SUMMARY OF THE INVENTION

One object of the present disclosure is to provide a free-standing carbonator that is particularly compact and sturdy. Such a carbonator is according to the present disclosure provided in form of a carbonator with a stationary part, a movable part that is movable in respect of the stationary part, and a guiding assembly for movably connecting the movable part and the stationary part. The guiding assembly comprises guide rod means and guide rod engagement means.

The guide rod means and guide rod engagement means allow for a very compact design, ensure a long life and a predictable, distinct and reliable handling avoiding the drawer effect. Thus, the carbonator of the present disclosure is less bulky, fragile and flimsy than prior art counterparts.

The guide rod engagement means may be adapted to engage the guide rod means with a minimal play. In addition, the guide rod engagement means may completely surround the guide rod means as seen in a transverse cross-section thereof. The guide rod engagement means may be configured to be movable along the longitudinal direction of the guide rod means. The guide rod means may extend in the vertical direction. The guide rod means may be arranged inside the stationary part. The guide rod engagement means may be configured to be secured in the transverse direction of the guide rod means.

A first end of the guide rod means may be supported by a foundation structure and a second end of the guide rod means may be supported by a support structure. The foundation structure and the support structure may be connected to each other by a stationary part housing. In this way, the stationary part housing may serve the dual purposes of housing the internal components of the stationary part and in addition connecting the foundation structure and the support structure to one another.

The first end of the guide rod means may be rigidly supported by the foundation structure in a manner not allowing displacement nor slope of the first end of the guide rod means. The second end of the guide rod means may be rigidly supported by the support structure in a manner not allowing displacement nor slope of the second end of the guide rod means. Such rigid support may be provided by the first and or second ends of the guide rod means being supported in openings having depths exceeding their widths, the depths may be at least two times the widths. The guide rod means may be of circular cross section and the openings may be holes of circular cross section. The holes may be blind holes, in order to provide an easy assembly.

The guide rod means may be attached to the stationary part and the guide rod engagement means may be attached to the movable part.

The guide rod engagement means may be attached to a carrier unit that is attached to the movable part, and the carrier unit may extend through an elongate opening in the stationary part housing. In this way, the stationary part housing may be designed as a closed tubular structure, apart from the elongate opening, which provides a high strength.

The stationary part housing and the guide rod means may be made of metal. Suitable metals are steel, in particular stainless steel, or aluminium.

The guide rod means may comprise two parallel guide rods. In particular guide rods of circular cross-section. However, the guide rods may have other cross-sections, such as rectangular or square. Solid guide rods of circular cross-section are especially preferred for reasons of cost and mechanical properties.

The guiding assembly may comprise two coaxial guide rod engagement means. Thereby, the guide rod means will be subject to less torque, in particular if the two coaxial guide rod engagement means are located at a distance from each other along the guide rod means. Said distance may be at least ten times the guide rod diameter.

The guiding assembly may comprise two parallel guide rod means and two coaxial guide rod engagement means engaging each guide rod means. In this way the movable part may be particularly rigidly supported stationary part.

The guide rod engagement means may be a linear bearing. The guide rod engagement means may be adapted to be slidably mounted on the guide rod means. The guide rod engagement means may be slide bearings. Such bearings are cost-effective, reduce friction and the drawer effect. The length of the slide bearings along the longitudinal direction of the assigned guide rod means may be at least three times the inner diameter of the slide bearings, in order to minimise the drawer effect.

The guiding assembly may comprise at least two guide rod engagement means and a carrier unit to which the guide rod engagement means are attached. Thereby an easy assembly as well as a rigid connection of the at least two guide rod engagement means may be obtained.

For easy operation of the carbonator, the guiding assembly may comprise a biasing arrangement for biasing the movable part towards an end position.

The guiding assembly may comprise two parallel guide rod means and the biasing arrangement may positioned essentially in-between the guide rod means. In this way, the biasing force of the biasing arrangement will be essentially aligned with the guide rod means in an advantageous manner. The biasing arrangement may be positioned equidistant from the two parallel guide rod means.

The biasing arrangement may comprise gas spring means comprising a tube body and a piston rod. Gas spring means, such as a gas spring, ensure a controlled, silent and even movement of the movable part. As compared to other spring types, gas spring means may exhibit a small difference in compressive force between full extension and full compression thereof.

The gas spring means may comprise two parallel piston rods operable in opposing directions. In order to increase the ratio of fully extended length to fully compressed length, the gas spring means may be configured such that the piston rods are arranged at least partly overlapping in their longitudinal direction in a compressed state of the gas spring means. A large fully extended length to fully compressed length ratio allows a compact design of the carbonator.

The gas spring means may comprise one single tube body with one piston rod operating in and out of each opposing end of the tube body. The gas spring means may comprise two tube bodies, one for each piston rod, and the tube bodies may be arranged adjacent each other and at least partly longitudinally overlapping. Such two tube bodies may be arranged fully longitudinally overlapping.

Each tube body may comprise an attachment protrusion at both ends thereof. Thereby, the tube bodies may by firmly attached to one another in a simple and reliable way. At least one attachment protrusion of each tube body may be threaded to facilitate fastening, e.g. by means of nuts.

In addition, the biasing arrangement may comprise coupling means for attaching the tube bodies to each other by means of the attachment protrusions of the tube bodies. For example, the coupling means may be an element with through-openings positioned such that two tube bodies may be arranged adjacent one another. The attachment protrusions may extend through the through-openings. Threaded attachment protrusions make possible the fixing of the attachment means by nuts.

The carbonator may comprise a carbonating head having a dissolver nozzle for introducing carbonating medium into the beverage container, a support part for movably supporting the carbonating head between a vertically highest and a vertically lowest position, a locking mechanism operable between an unlocked and a locked state in which the carbonating head is retained in the vertically lowest position. The carbonator may be configured such that movement of the carbonating head to the vertically lowest position sets the locking mechanism in the locked state. The carbonator may comprise a base part connected to the support part and a beverage container stand for the beverage container. The locking mechanism may comprise a first locking member that is arranged on the carbonating head and a second locking member that is arranged on the base part. The previously mentioned movable part may be the carbonating head and the previously mentioned stationary part may be the support part.

BRIEF DESCRIPTION OF THE DRAWINGS

The present invention will be described further below by way of example and with reference to the enclosed drawings, in which.

DETAILED DESCRIPTION OF EMBODIMENTS

Figure 1:
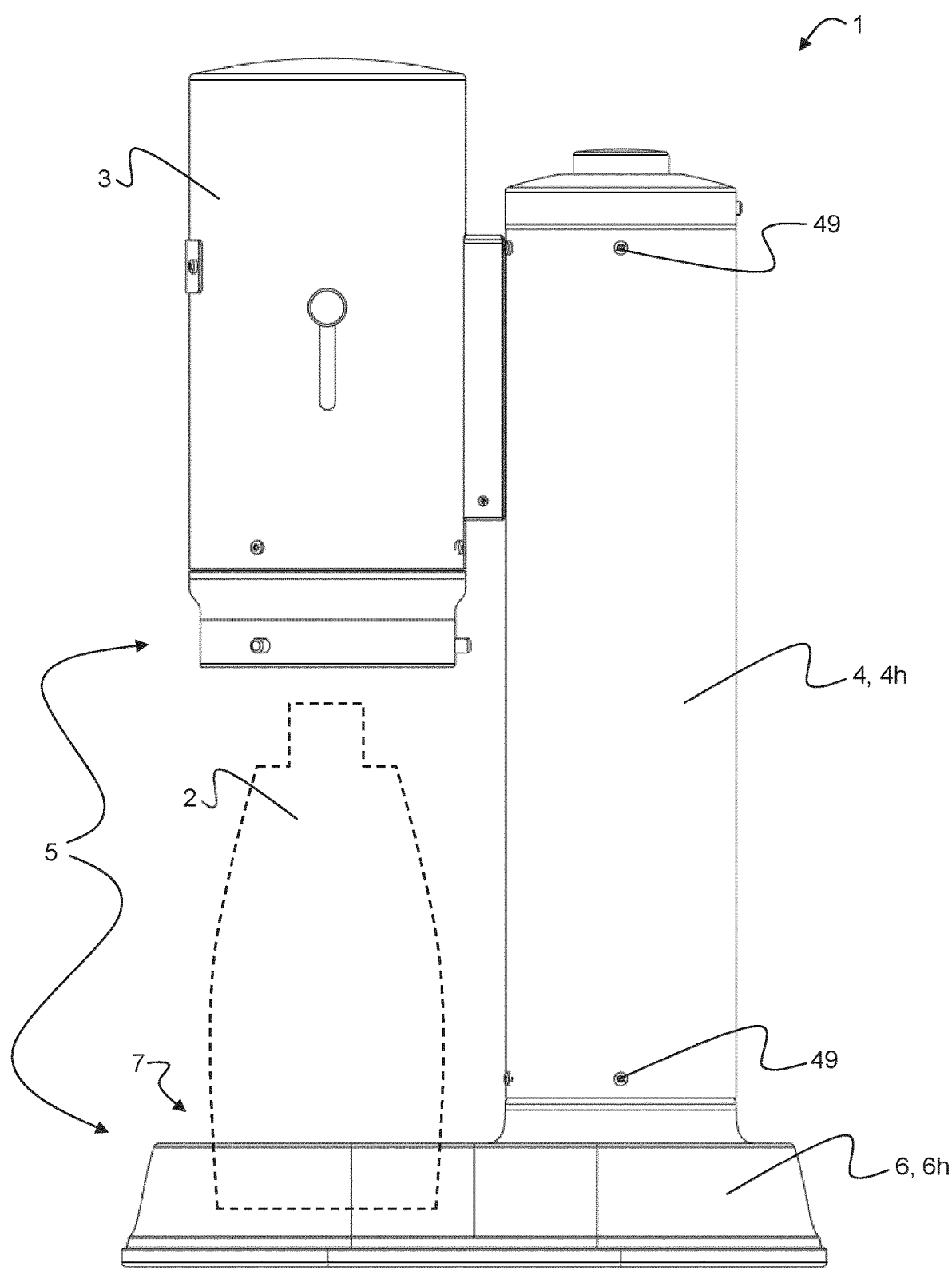
FIG. 1 is a side view of a carbonator 1 with a carbonating head 3, a support part 4 and a base part 6, FIG. 2 corresponds to FIG. 1 but with a carbonating head housing and a base part housing 6h removed.

Embodiments of the present disclosure will now be described more fully hereinafter with reference to the accompanying figures. Like reference numbers refer to like elements throughout the description and figures.

In the figures is shown a carbonator 1 with a carbonating head 3, a support part 4, a locking mechanism 5 and a base part 6. In some of the figures, a beverage container 2 is also illustrated.

The carbonating head 3 comprises a dissolver nozzle (not shown) which during operation is immersed in liquid, typically water, contained in the beverage container 2 in form of a bottle 2. The carbonating head 3 has a generally cylindrical shape with a central longitudinal axis oriented in the vertical direction when the carbonator 1 is in operation position, see FIG. 1.

Figure 3A:
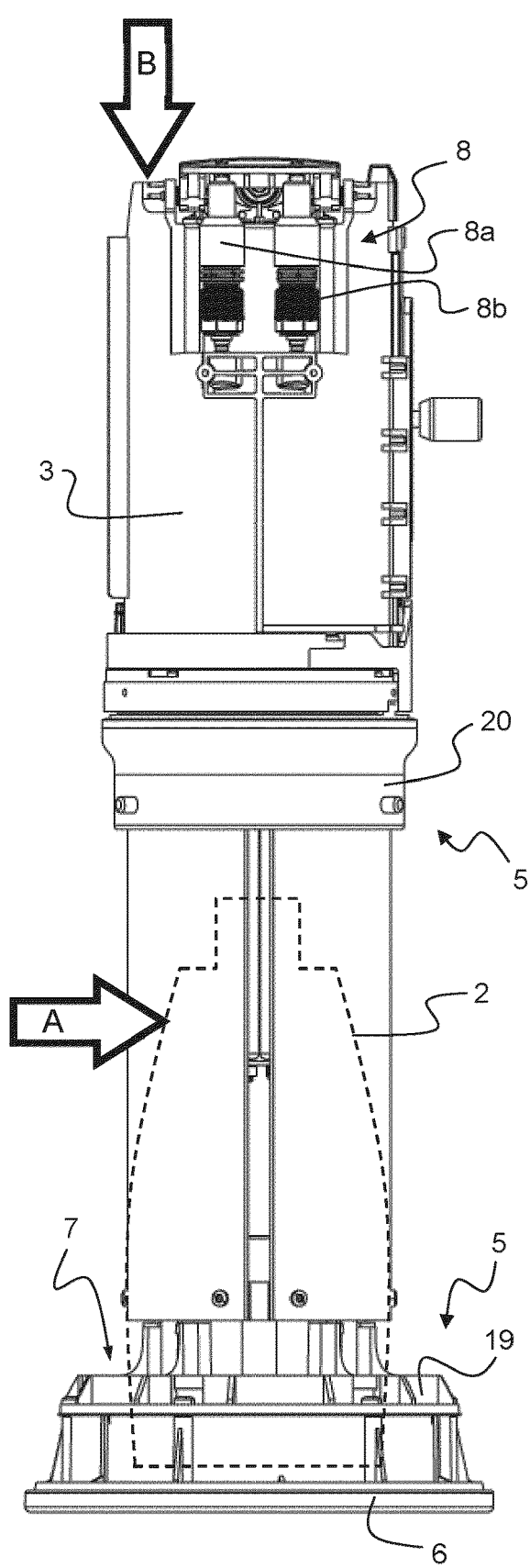
FIGS. 3a-3b are front views corresponding to FIG. 2 with the carbonating head 3 in a vertically highest and lowest position, respectively, and also illustrate a method A-D of operating a carbonator.
Figure 3B:
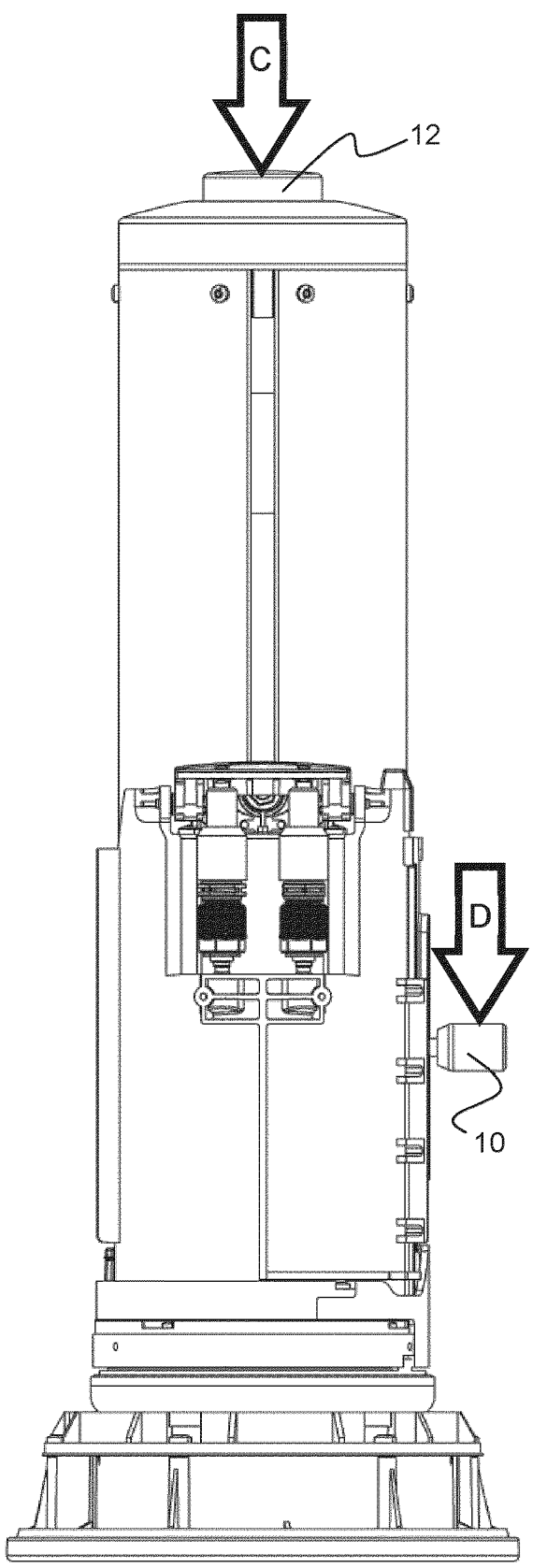

FIGS. 3a and 3b illustrate a method of operating the carbonator 1. The components and features of the carbonator 1 will be described further down below.

In a first step A, a user places the bottle 2 on a stationary and horizontal bottom of a bottle stand 7 of the base part 6. The bottle stand 7 has a bottle guiding structure that by means of gravity guides the bottle 2 to a vertical orientation straight beneath the carbonating head 3. A biasing arrangement 55, described below, within support part 4 biases the carbonating head 3 towards its vertically highest position as shown in FIG. 3a.

In a second step B, the user moves the carbonating head 3 downwards until the carbonating head 3 is locked to the bottle stand 7 of the base part 6 in its vertically lowest position, see FIG. 3b. Most conveniently, the carbonating head 3 is moved downwards by the user pushing it atop its housing by hand. The bottle 2 is now enclosed in a protecting bottle compartment. At the end of the movement, the carbonating head 3 is automatically locked to the bottle stand 7 by means of a locking mechanism 5 having cooperating locking members 20, 19 arranged on the carbonating head 3 and on the bottle stand 7, respectively.

Preferably, the second step B involves exercising a venting valve arrangement 8 by setting it in an open state and in a closed state in succession.

In a third step C, the user presses a push button 12 on the support part 4 downwards to introduce carbonating medium into the bottle 2 via the dissolver nozzle. The pressure within the bottle 2 increases and $CO_2$ is dissolved in the water. When the pressure inside the bottle 2 reaches a predetermined value, e.g. 5-7 bar, the venting valve arrangement 8 opens and emits a sound generated by the gas flow through the valve arrangement 8. The pressure inside the bottle 2 remains at the predetermined value and the push button 12 may be pressed repeatedly should the user desire strongly carbonated beverage.

In a fourth step D, the user moves a release manipulator 10 of the carbonating head 3 downwards until the overpressure within the bottle has been completely relieved, by the venting valve arrangement 8 opening, and subsequently the locking mechanism 5 has been unlocked. The carbonating head 3 will next be biased back to its vertically highest position (FIG. 3*a*) by the biasing arrangement 55 of the support part 4.

The method is now complete and the user may remove the bottle 2 with the carbonated liquid from the bottle stand 7.

After these method steps A-D, the carbonator 3 is ready to carbonate again without any preparation. The carbonating head 3, the release manipulator 10 and the push button 12 are all automatically returned to their respective vertically highest positions.

Importantly, all method steps A-D may be executed using one hand only. The bottle 2 is conveniently placed on and retrieved from a stationary horizontal surface provided by the bottle stand 7, the carbonating head 3, push button 12 and release manipulator 10 are all pushed downwards whereby the free-standing carbonator 1 needs not be held still.

The valve exercise that may form part of step B reduces the risk of the venting valve arrangement 8 becoming clogged. The opening of the venting valve arrangement 8 in step D to completely relieve the overpressure within the bottle 2, before unlocking the locking mechanism 5, prevents opening the compartment while there is an overpressure in the bottle 2.

The components and features of the carbonator 1 will now be described in more detail.

Figure 2:
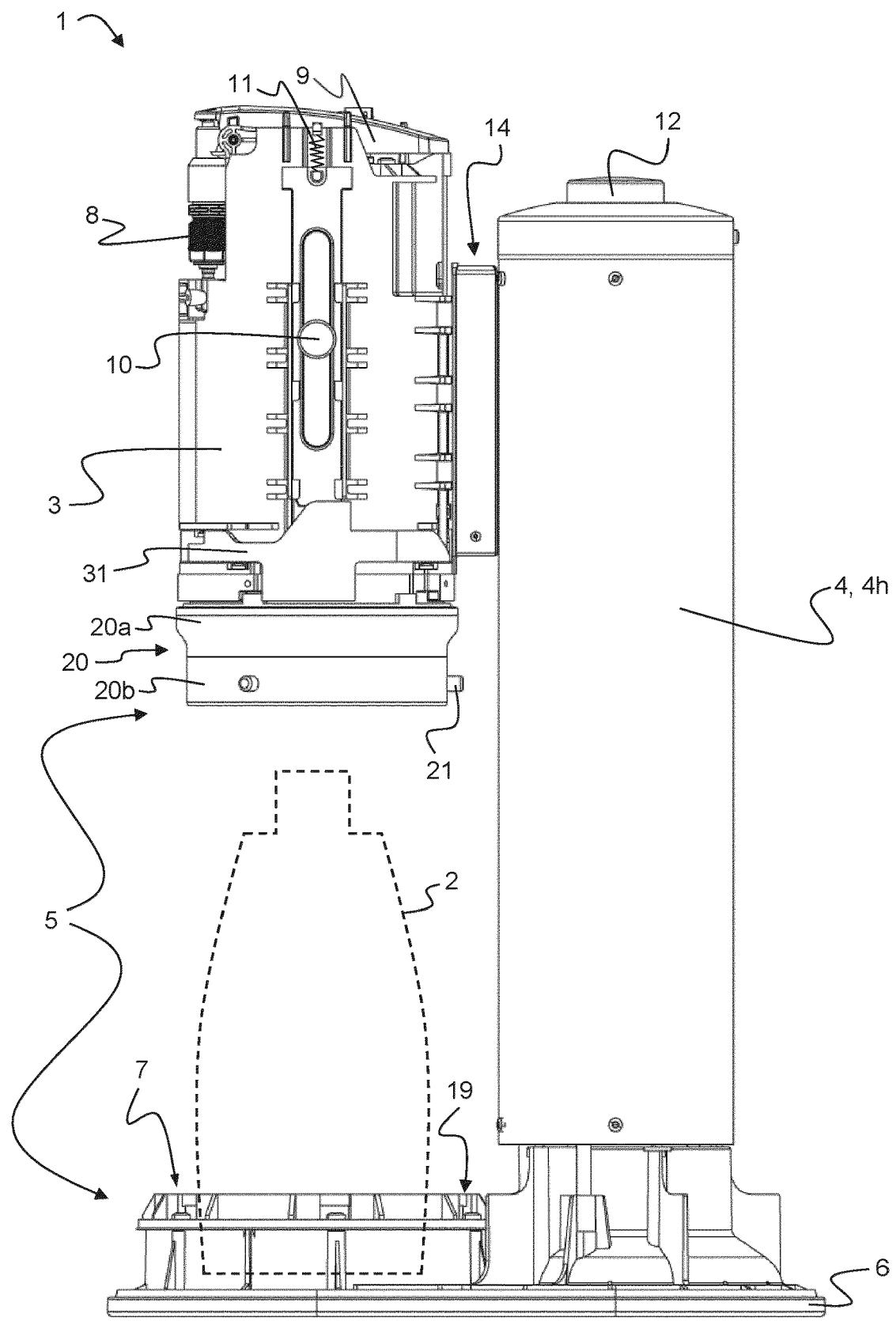

The carbonating head 3 is shown in detail in FIG. 2. The carbonating head 3 is vertically movably supported by the support part 4 between a vertically highest position and a vertically lowest position.

The carbonating head 3 is largely a thin-walled cylindrical structure and forms a recess extending from below into the structure. The recess forms the side and top of the above-mentioned compartment that is sized to enclose essentially the whole bottle 2. More precisely, the carbonating head 3 and the bottle stand 7 together form the compartment. There is a risk that the bottle 2 may break upon introduction of carbonating medium into the bottle 2 and in such an event, the compartment may effectively protect the user from ejected liquid and larger beverage container fragments. This is of particular importance should a glass bottle 2 be used.

The carbonating head 3 comprises sealing means (not shown) which are adapted to sealingly couple the mouth of the bottle 2 to the carbonating head 3 without requiring the bottle 2 being manually screwed or otherwise moved with respect to the carbonating head 3. The carbonating head 3 may conveniently be sealingly coupled to the mouth of the bottle 2 by the movement of the carbonating head 3 to its vertically lowest position. Suitable dissolver nozzles and sealing means are known per se, see for example EP1642637A1

A sliding lever 10, which forms the release manipulator, of the carbonating head 3 protrudes out from a lateral side thereof. As most users are right handed, most users will appreciate the sliding lever 10 being positioned on the right hand side. The sliding lever 10 is located essentially vertically centrally on the carbonating head 3. The sliding lever 10 is conveniently used both to relieve the pressure within the bottle 2 by opening the venting valve arrangement 8 and to subsequently unlock the locking mechanism 5.

The sliding lever 10 travels in a vertical track provided in the carbonating head 3. The sliding lever 10 may be biased towards the vertically highest position by means of a sliding lever tension spring 11. The sliding lever tension spring 11 is however optional, as the sliding lever 10 is biased towards is vertically highest position by the locking sleeve return spring 34, as is described below with reference to FIG. 5*a*.

The venting valve arrangement 8 of the present embodiment comprises two venting valves 8*a*, 8*b* (see FIG. 3*a*) fluidly connected in parallel. Should a user fill too much liquid in the bottle 2, upon carbonation some of the excess liquid may be transferred via the dissolver nozzle to the venting valve arrangement 8 and be ejected therefrom. Should a user carbonate other liquids than water, such liquids may clog the valve arrangement 8 after a period of use. The provision of two venting valves 8*a*, 8*b* in parallel reduces the risk of venting valve malfunction. Furthermore, the dual venting valves 8*a*, 8*b* reduce the time needed to completely relieve the overpressure within the bottle 2 by the sliding lever 10.

A first venting valve 8*a* is set to open at a first pressure of e.g. 5-7 bar and emit a sound as has been described above. A second venting valve 8*b* is set to open at a second pressure that is higher than the first pressure, e.g. 8-10 bar. The second venting valve 8*b* may thus be referred to as a safety valve. The venting valve arrangement 8 of the carbonating head 3 is operable between a closed state and an open state. Each venting valve 8*a*, 8*b* of the valve arrangement 8 is furnished with a compression spring biasing the valve 8*a*, 8*b* towards the closed state. In the open state of the venting valve arrangement 8, the bottle 2 is in fluid connection with the surrounding. More precisely the upper part, not filled with liquid, of the bottle 2 is in fluid connection with the surrounding.

The venting valve arrangement 8 is advantageously positioned to eject any liquid onto the upper part of the bottle 2. Thereby the user is informed of the inappropriate overfilling of the bottle 2.

Figures 5A, 5B, 5C:
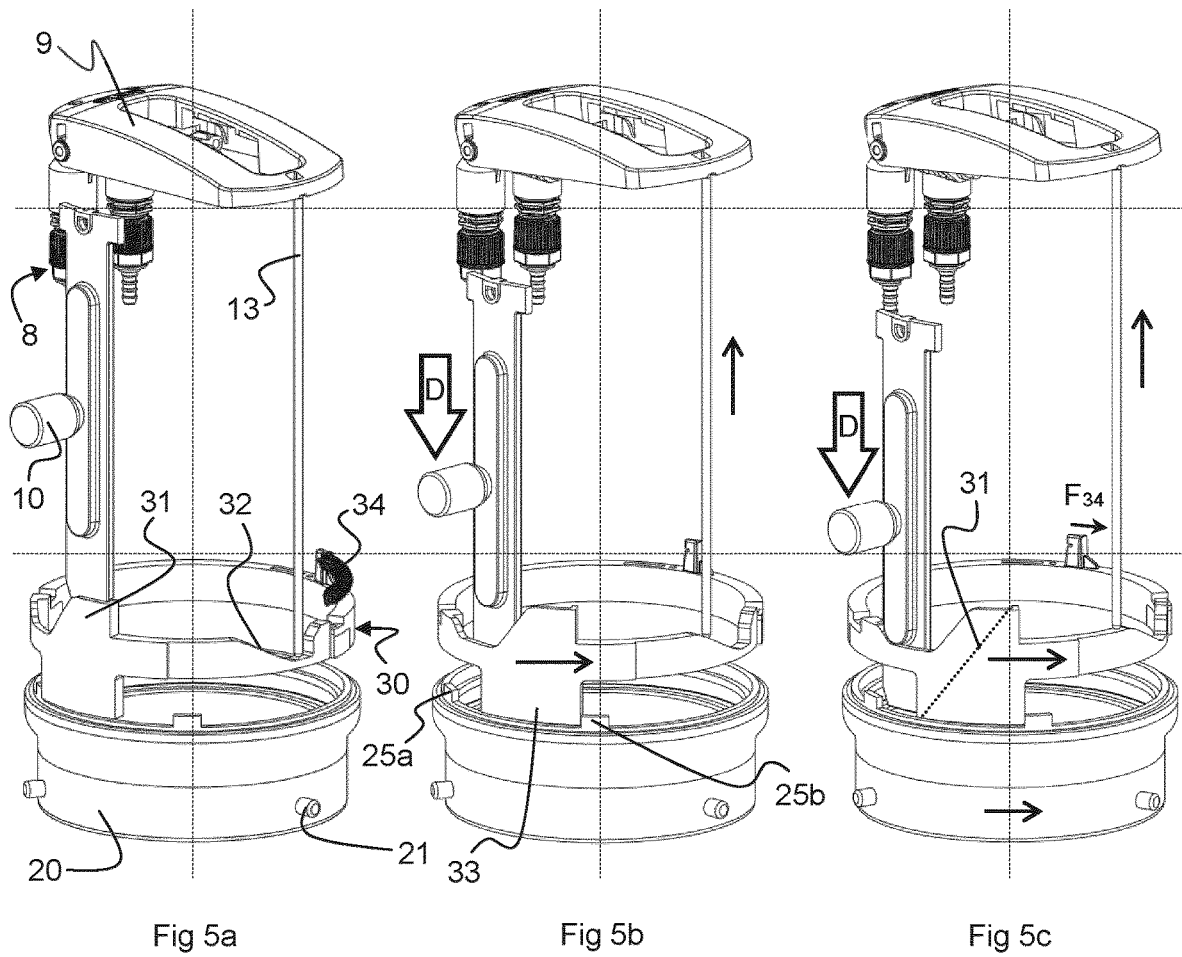
FIGS. 5a-5c are exploded views illustrating interaction of components of the carbonator 1 of FIG. 1, FIG. 6 corresponds to FIG. 1 but with a support part housing 4h and the base part housing 6h removed.

The two venting valves 8*a*, 8*b* are in the present embodiment actuated by a single pivoting valve actuator 9 located at the top of the carbonating head 3. The pivoting valve actuator 9 is pivotally journalled on the carbonating head 3 by means of a hinge connection. A vertically movable rod actuator 13 is arranged to actuate the pivoting valve actuator 9, as is shown in FIGS. 5*a* to 5*c*. The rod actuator 13 is in turn actuated by the locking mechanism 5.

Thus, both venting valves 8*a*, 8*b* are opened and closed (exercised) when the carbonating head 3 is moved downwards until being 3 locked to the bottle stand 7 by the locking mechanism 5 (step B). More precisely, the venting valves 8*a*, 8*b* are exercised at the end of the stroke of the carbonating head, i.e. when the bottle stand 7 rotates the locking sleeve 20, as is described below. After the push button 12 has been depressed to carbonate the water, only the first venting valve 8*a* will open and signal to the user that a carbonation has been completed (step C). During carbonation, the second valve 8*b* is a redundant valve (safety valve). Both venting valves 8*a*, 8*b* are opened when the sliding lever 10 is moved downwards to relieve the overpressure within the bottle 2 and unlock the carbonating head from the bottle stand 7.

Returning to FIG. 2, the support part 4 is largely a hollow cylindrical structure receiving a $CO_2$ cylinder (not shown) that provides carbon dioxide to the dissolver nozzle of the carbonating head 3. At the top, the support part 4 is furnished with a pressurizing manipulator 12, which may be referred to as a push button 12, operable by a user between a vertically highest position and a vertically lowest position. The pressurizing manipulator 12 is biased towards the vertically highest position by means of the pressure within the $CO_2$ cylinder, a spring within the $CO_2$ cylinder, and/or additional biasing means (not shown).

The carbonating head 3 is carried by the support part 4 by means of a carrier unit 14. The support part 4 supports the carbonating head 3 such that it is translatory movable, more precisely linearly movable, from its vertically highest position to its vertically lowest position. A biasing means, such as one or more springs, (not shown) of the support part 4 biases the carrier unit 14 and thus the carbonating head 3 towards the vertically highest position.

The base part 6 essentially comprises two sections, a first section (left in FIG. 1) with the bottle stand 7 and a second section (right in FIG. 1) that forms a foundation for the support part 4. The base part 6 provides a stable basis for the support part 4 and thus the carbonating head 3. The base part 6 is adapted to be placed on a flat surface such as a table or a kitchen countertop and may comprise rubberised feet or similar.

FIG. 2 illustrates a bottle 2 placed on the bottle stand 7 of the base part 6. The bottle stand 7 generally has the shape of a circular trough, a standing closed-bottom cylinder with a diameter greater than the height.

The locking mechanism 5 comprises members arranged on the carbonating head 3 and on the base part 6, respectively, which engage in a bayonet-fitting manner when in the locked state.

The carbonating head 3 comprises a first locking member in form of a locking sleeve 20 that is rotatably mounted on the lower end of the carbonating head 3. The locking sleeve 20 is rotatable around the central axis of the carbonating head 3. i.e. in a horizontal plane. The locking sleeve 20 comprises an upper, or proximal, portion 20a and a lower, or distal, portion 20b. The proximal portion 20a has an outer diameter that corresponds to the diameter of the carbonating head 3. The distal portion 20b has a smaller diameter and is provided with a number of, in this example three, locking protrusions 21. The locking protrusions 21 are of cylindrical form and protrude normal to distal portion 20b.

The base part 6 is configured to receive, rotate and lock the locking sleeve 20. The rotation of the locking sleeve 20 causes a vertical motion of the rod actuator 13.

In more detail, the bottle stand 7 of the base part 6 is configured to receive the distal portion 20b of the locking sleeve 20. The bottle stand 7 has a second locking member in form of a receiving structure 19. The receiving structure 19 protrudes inwards from the cylindrical wall of the bottle stand 7 and has three passages forming protrusion receivers 22. The protrusion receivers 22 are formed and positioned to receive the three locking protrusions 21.

Figure 4:
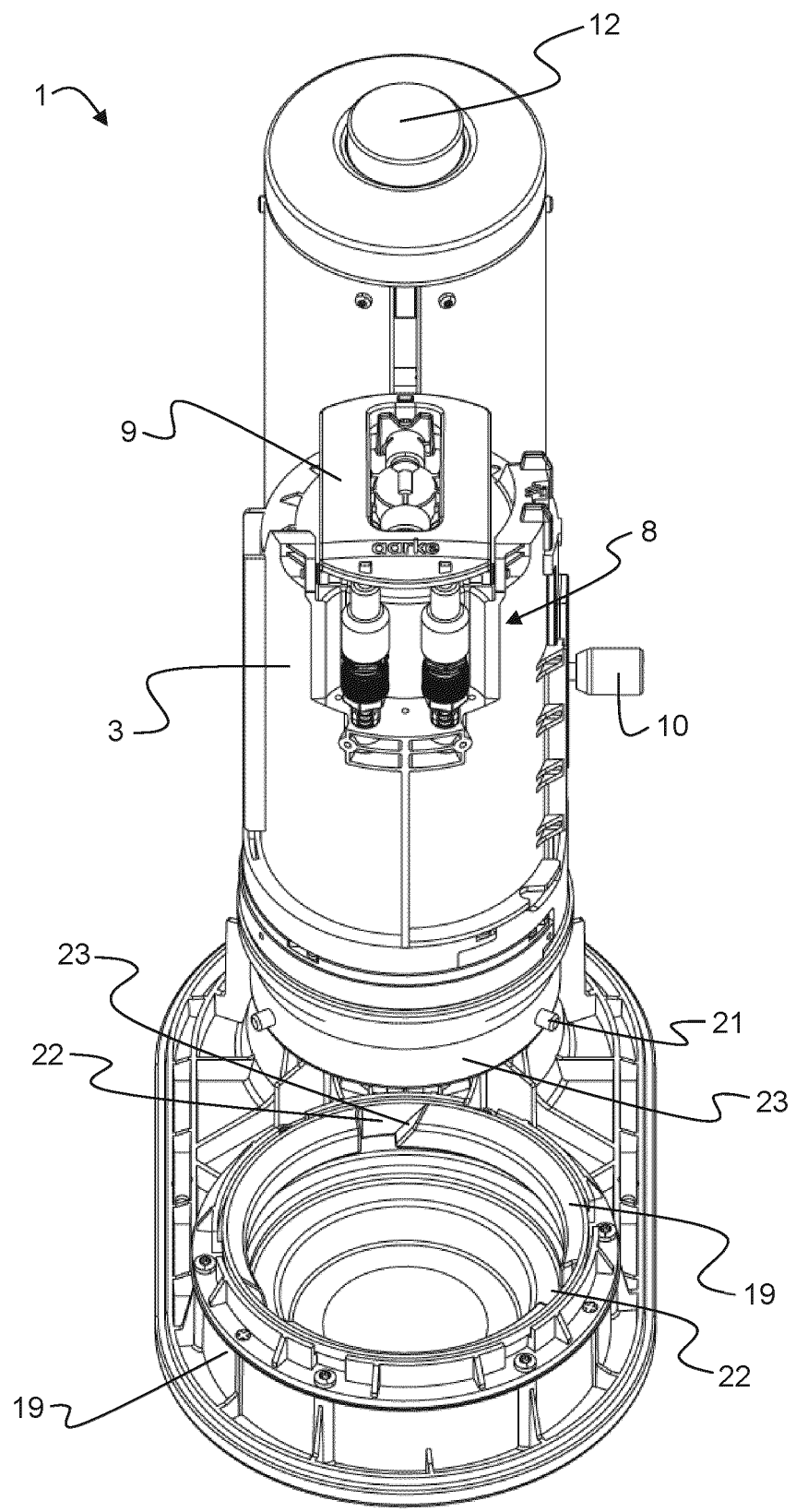
FIG. 4 is a perspective view of the carbonator 1 of FIG. 2 with the carbonating head 3 positioned in-between the vertically highest position and the vertically lowest position.

As is illustrated in FIG. 4, each protrusion receiver 22 comprises an inclined guide surface 23. As the respective locking protrusion 21 slides along the respective guide surface 23, the locking sleeve 20 is rotated counter clockwise, as seen from above. The guide surface 23 thus translates a vertical movement into a horizontal movement. When the locking protrusions 21 have travelled passed the protrusion receivers, the locking sleeve is rotated clockwise by the action of a locking sleeve return spring 34 (spring shown in FIG. 5a, spring force $F_{34}$ indicated in FIG. 5c). The locking protrusions 21 are now axially locked beneath the receiving structure 19. The locking sleeve 20 cooperates with the receiving structure 19 of the bottle stand 7 similar to a bayonet fitting, i.e. in a form-fitting manner.

FIGS. 5a to 5c illustrate the function of the sliding lever 10 that is used to unlock the locking sleeve 20 from the receiving structure 19. In FIG. 5a the sliding lever 10 is in its vertically highest position. In FIG. 5b, the sliding lever 10 has been pushed down halfway towards its vertically lowest position, which is shown in FIG. 5c. The distance travelled by the sliding lever 10 from its vertically highest position to its vertically lowest position may be 3 to 10 cm, preferably 3 to 6 cm.

The sliding lever 10 comprises sliding plate that cooperates with a release member in form of a release sleeve 30. The release sleeve 30 is rotatably mounted on the lower end of the carbonating head 3, above the locking sleeve 20. As is clear from FIGS. 1 and 2, the release sleeve 30 is covered by the carbonating head 3 housing whereas the locking sleeve 20 forms the lowermost visible part of the carbonating head 3 and adjoins the lowermost edge of its housing.

The locking sleeve 20 and the release sleeve 30 cooperate such that the venting valves 8a, 8b are opened before the locking mechanism 5 is unlocked, and such that the venting valves 8a, 8b are exercised when the locking mechanism 5 is engaged.

When the sliding lever 10 is pushed down, the lower end of the sliding plate travels along a release cam surface 31 (see FIG. 5c) of the release sleeve 30 and causes the release sleeve 30 to rotate counter clockwise as seen from above. The release sleeve 30 further comprises an actuator cam surface 32 (see FIG. 5a) that cooperates with the rod actuator 13. When the release sleeve 30 rotates counter clockwise, the actuator cam surface 32 causes the rod actuator 13 to move upwards.

The release cam surface 31 and the actuator cam surface 32 are configured such that the rod actuator 13 starts travelling upwards soon after the sliding lever 10 leaves its vertically highest position since the lower end of the rod actuator 13 rests against a short horizontal surface of the release sleeve 30 to the right of the actuator cam surface 32, as is clear from FIG. 5a. When the sliding lever 10 has been pushed down halfway (FIG. 5b), the rod actuator 13 has opened the venting valves 8a, 8b via the valve actuator 9. Should either one of the venting valves 8a, 8b not function properly, e.g. be clogged, a movement downwards of the sliding lever 10 is hindered. The sliding lever 10 is hindered from being moved to its vertically lowest position (FIG. 5c) before the venting valves 8a, 8b have been opened by the rod actuator 13 and the pivoting valve actuator 9. Thus, an opening of the compartment while there is an overpressure in the bottle 2 is prevented.

The release sleeve 30 comprises a first abutment means in form of an axial projection 33 that is caught between second and third axial projections 25a, 25b of the locking sleeve 20. When the sliding lever 10 has been pushed down halfway, the first axial projection 33 of the release sleeve 30 abuts against the third axial projection 25b of the locking sleeve (see FIG. 5b) and causes the locking sleeve 20 to rotate along with the release sleeve 30 counter clockwise. When the sliding lever 10 has reached its lowermost position, the locking sleeve 20 has rotated to align its locking protrusions 21 with the protrusion receives 22, and thus the locking sleeve 20 is no longer retained axially by the receiving structure 19. The carbonating head 3 can now be biased back to its vertically highest position by the biasing arrangement 55.

When the locking sleeve 20 is rotated counter clockwise during locking the carbonating head 3 to the bottle stand 7 as described above, the second axial protrusion 25a of the locking sleeve 20 abuts against the first axial protrusion 33 of the release sleeve 30 and causes the release sleeve 30 to rotate along with the locking sleeve 20 counter clockwise. By means of the actuator cam surface 32, the rod actuator 13 and the valve actuator 9, such rotation of the release sleeve 30 opens the venting valves 8a, 8b. When the release sleeve 30 is subsequently rotated clockwise by the locking sleeve tension spring 34 (see force $F_{34}$ in FIG. 5c), the venting valves 8a, 8b are again closed by a reverse motion of the actuator cam surface 32, the rod actuator 13 and the valve actuator 9. Thus, when the carbonating head is brought down to be locked to the base part 6, the venting valves 8a, 8b are exercised by being opened and closed in succession.

When the carbonating head 3 is locked to the base part 6, the bottle stand 7 closes the compartment. As the compartment is dimensioned to enclose essentially the whole bottle 2 and is brought down over the bottle 2, the joint between the carbonating head 3 and the base bottle stand 7 is located close to the bottom of the bottle 2. Such a location of the joint may be particularly beneficial, as it is believed that the bottle 2 is more likely to break at an upper portion thereof, which upper portion is located remote from the joint.

Furthermore, no matter where the bottle 2 breaks, a substantial pressure energy is stored in the upper portion of the bottle 2, where a compressive gas (air and $CO_2$) is located.

The carbonating head 3, release manipulator 10 and pressurizing manipulator 12 are all operable by a user from a respective vertically higher position to a respective vertically lower position. In the embodiments of this disclosure, they are all adapted to move downwards in the vertical direction during operation, more precisely straight downwards in the vertical direction. As will be appreciated, the respective movements need not be straight nor exactly vertical. The carbonator 1 may in other embodiments be configured such that at least one of the movements follows a curve and/or deviates to some extent, for example up to 20 degrees, from the vertical direction.

Importantly, though, the movements are from a vertically higher position to a vertically lower position such that one-hand use is allowed. The forces applied by a user to the carbonating head 3, to the pressurizing manipulator 12 and to the release manipulator 10 are all directed downwards whereby one-hand use is possible. Such forces press the carbonator 1 towards the surface on which it rests and thus there is no need to hold the carbonator 1 or fix it to the surface.

Throughout this disclosure, the direction "downward" is to be understood as referring to the orientation of the carbonator 1 when positioned for operation, as depicted. The arrows B, C and D, in FIGS. 3a, 3b, 5b and 5c are hence directed downward.

Figure 6:
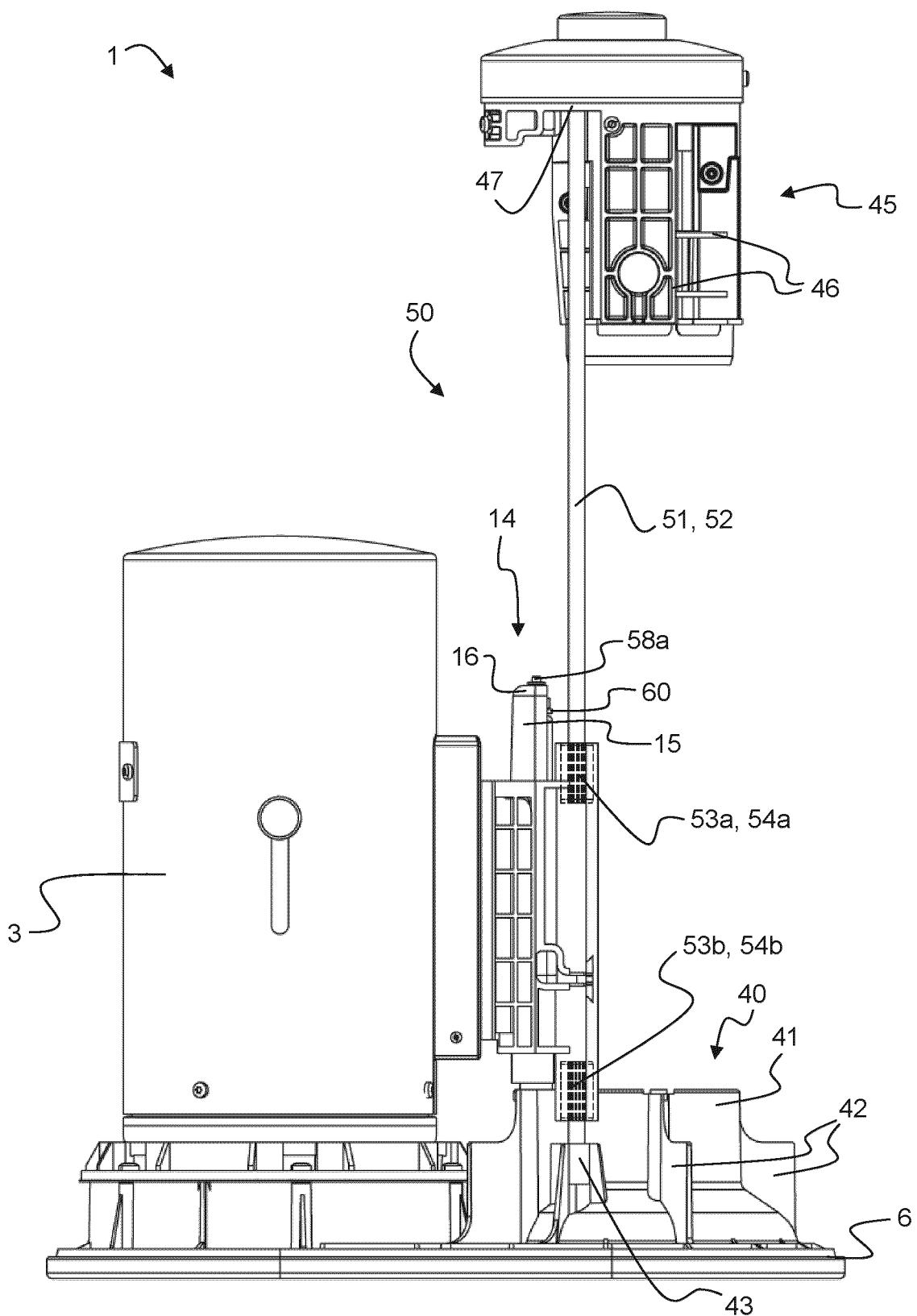
Figure 7:
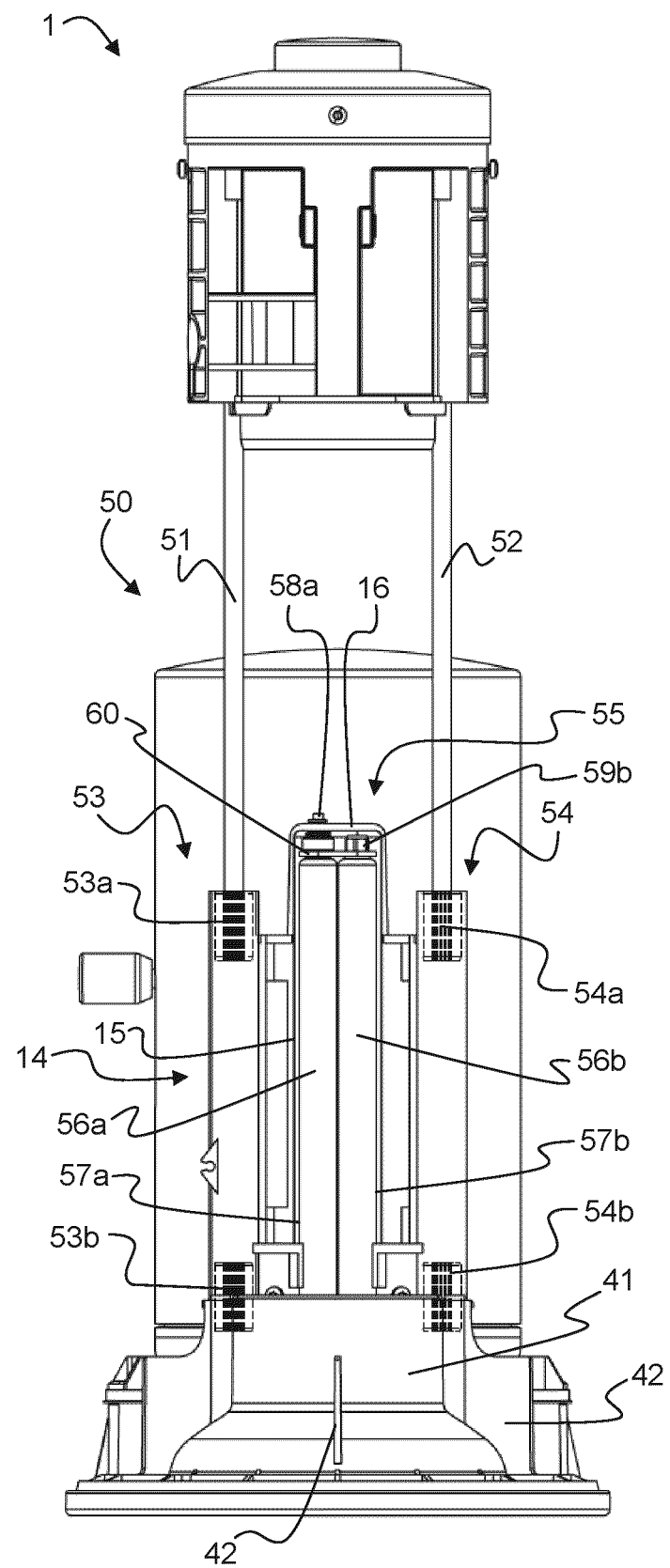
FIG. 7 is a rear view corresponding to FIG. 6.

The above described support part 4 and base part 6 are stationary whereas the carbonating head 3 is movable. With particular reference to FIGS. 6 and 7, a guiding assembly 50 that movably connects the carbonating head 3 to the support part 4 will now be described.

The guiding assembly 50 comprises a first and a second guide rod 51, 52 of metal, more precisely of stainless steel. As is shown in FIGS. 6 and 7, the guide rods 51, 52 may be arranged inside the stationary part 4. As is shown, the guide rods 51, 52 may extend in the vertical direction.

By the provision of two guide rods 51, 52, the support part 4 may support the carbonating head 3 such that the latter cannot rotate around the longitudinal (axial in FIGS. 6 and 7) direction of the guide rods 51, 52. The guide rods 51, 52 extend in parallel in an imaginary guide rod plane. The guide rods 51, 52 are positioned at a distance from each other, allowing a portion of the $CO_2$ cylinder to be received in-between the guide rods 51, 52. For example, the guide rods 51, 52 may be positioned 40 to 50 mm apart.

As is particularly clear from FIG. 6, the lower ends of the guide rods 51, 52 are rigidly supported by the base part 6. The base part 6 internally comprises a foundation structure 40 supporting the guide rods 51, 52. In this embodiment, the foundation structure 40 is made of plastic.

The foundation structure 40 is a rigid structure reinforced by a number of reinforcing ribs 42. The foundation structure 40 has a cylindrical through-opening (not shown) formed by a tubular wall section 41. When the $CO_2$ cylinder is inserted into the support part 4, the $CO_2$ cylinder is inserted from below through the through-opening formed by the tubular wall section 41. A number of reinforcing ribs 42 extend radially from the tubular wall section 41.

The foundation structure 40 further comprises two lower rod receiving openings 43 receiving the lower ends of the first and second guide rods 51, 52 (only one opening 43 is visible in FIG. 6). The lower rod receiving openings 43 are furnished with a reinforcing rib structure and are formed in one piece with the tubular wall section 41. Each lower rod receiving opening 43 has a depth that exceeds the width of the opening, the depth is in this embodiment approximately three times the width. Any transverse forces acting on the guide rods 51, 52 and any torques around axes that are normal to the longitudinal axes of the guide rods 51, 52 are absorbed by the foundation structure 40. Thus, the lower ends of the guide rods 51, 52 are rigidly supported by the base part 6 which, in turn, is firmly connected to the support part 4. The lower rod receiving openings 43 may be blind holes of circular cross-section.

FIG. 1 shows the carbonator 1 with the base part housing 6h and the support part housing 4h. The base part housing 6h and the support part housing 4h are made of metal, more precisely stainless steel, and thereby the housings 4h, 6h offer the carbonator 1 a great deal of rigidity. Other conceivable metals include steel and aluminium. As is indicated, the housings 4h, 6h may be riveted or screwed together (see screw heads 49 at lower and upper ends of support part 4 housing). Through-holes for the rivets or screws are formed in tubular housing portions, one of which snugly fit into the other.

The support part housing 4h is thus rigidly supported by the base part housing 6h. The support part housing 4h in turn rigidly supports an upper support structure 45 provided internally of the support part housing 4h at the upper end thereof.

The upper support structure 45 is provided with a threaded element (not shown) receiving the $CO_2$ cylinder outlet in a manner known per se, and comprises $CO_2$ valve means (not shown) controlled by the pressurizing manipulator 12. The upper support structure 45 is a rigid structure, in this embodiment made of plastic, strengthened by a lattice of reinforcing ribs 46. The upper support structure 45 comprises upper rod receiving openings 47 receiving the upper ends of the guide rods 51, 52. Even though not shown in detail, the upper rod receiving openings 47 have a depth that exceeds the width. Thus, the upper ends of the guide rods 51, 52 are rigidly supported by the support part 4. The upper rod receiving openings 47 may be blind holes of circular cross-section.

The guide rods 51, 52 are thus rigidly supported by the carbonator 1. There are support structures 40, 45 rigidly supporting the upper and lower guide rod ends, and the support structures 40, 45 are firmly connected with respect to each other by housings 4h, 6h. The upper and lower guide rod ends are supported such that no displacement and no rotation is allowed. As expressed in beam theory terms, the upper and lower guide rod ends have fixed or build-in support, both displacement (normal to the guide rods) and slope can be set to zero.

As has been mentioned, the carbonating head 3 is carried by the support part 4 by means of the carrier unit 14. The carrier unit 14 carries the carbonating head 3 along the guide rods 51, 52. The carrier unit 14 comprises a number of guide rod engagement means in the form of slide bearings 53a-b, 54a-b.

In other embodiments (not shown), the guide rod engagement means may be guide holes, guide cylinders, a number of angularly distanced rollers, slide bushings or ball bushing bearings.

The slide bearings are constructed to avoid any drawer effect. In the present embodiment, the length of the bearings 53a-b, 54a-b along the longitudinal direction of the assigned guide rod 51, 52 is approximately four times the inner diameter of the bearings 53a-b, 54a-b.

In the embodiment shown in FIGS. 6 and 7, the carrier unit 14 comprises two pairs of slide bearings 53, 54. There is a first pair of slide bearings 53 arranged on a first lateral side (left in FIG. 7) of the carrier unit 14 that are adapted to slide along the first guide rod 51. There is a second pair of slide bearings 54 arranged on a second lateral side (right in FIG. 7) of the carrier unit 14 that are adapted to slide along the second guide rod 52. Thus, the carrier unit 14 comprises four slide bearings 53a, 53b, 54a, 54b in total.

The slide bearings 53a-b, 54a-b of the respective pair 53, 54 are arranged coaxial at a distance from each other along the longitudinal axis of the respective guide rod 51, 52. In this example, the said distance approximately equals 15 times the guide rod radius. By providing a pair of slide bearings to travel along a guide rod, a torque transmitted to the guide rod via the carrier unit 14 will be distributed as transverse forces acting on the guide rods 51, 52. In this way, the guide rods 51, 52 even more rigidly support the carrier unit 14 and thus the carbonating head 3. Also, the bending of the guide rods 51, 52 will be minimised. Furthermore, two slide bearings arranged at a longitudinal distance from each other will minimise any drawer effect, and may allow the use of slide bearings of shorter individual length.

As is clear from e.g. FIGS. 4 and 6 in conjunction, the carrier unit 14 extends through an elongate opening in the stationary part housing 4h.

The guiding assembly 50 further comprises a biasing arrangement 55 biasing the carrier unit 14, and thus the carbonating head 3, towards its vertically highest position. The biasing arrangement 55 extends in parallel with the first and second guide rods 51, 52. As is can be seen in FIG. 7, a projection of the biasing arrangement 55 onto the guide rod plane is positioned between the first and second guide rods 51, 52. As is can be seen in FIG. 6, the biasing arrangement 55 is positioned between the guide rods 51, 52 and the carbonating head 3, as seen from a lateral side of the support part 4.

The biasing force, or spring force, of the biasing arrangement 55 is generated by two gas springs 56a, 56b as is best shown in FIG. 7. Each gas spring 56a, 56b comprises a tube body 57a, 57b and a piston rod 58a, 58b, as is known per se. The piston rod 58a, 58b is reciprocally movable in and out of a piston opening of the tube body 57a, 57b.

The gas springs 56a, 56b are arranged in opposite directions. As is understood from FIG. 7, the piston opening of the first gas spring 56a is directed upwards whereas the piston opening of the second gas spring 56b is directed downwards. The tube bodies 57a, 57b are arranged overlapping, more precisely such that they extend over the same longitudinal distance. Thereby, the biasing arrangement 55 occupies the same longitudinal space as one single gas spring, but provides twice the stroke.

The tube bodies 57a, 57b are attached to one another by coupling means in the form of tube brackets 60 at both ends of the biasing arrangement 55. Each tube bracket 60 is an elongated plate shaped element with two through-openings, one for each tube body 57a, 57b. The tube bracket 60 is made of metal, such as steel, in particular stainless steel, or aluminium. Both ends of the respective tube bodies 57a, 57b comprise threaded protrusions (not shown) that when assembled pass though the respective through-openings of the tube brackets 60. The threaded protrusions are fixed to the tube brackets by nuts 59a, 59b.

The carrier unit 14 is in this embodiment made of plastic and comprises a lattice of reinforcing ribs. The carrier unit 14 has a receiving space 15 for the biasing arrangement 55, into which the biasing arrangement 55 moves when in the compressed state, as is shown in FIGS. 6 and 7 where the carbonating head is located in its vertically lowest position. When the biasing arrangement 55 is in its extended state (not shown), i.e. when the carbonating head is located in its vertically highest position, the biasing arrangement will be moved out from the receiving space 15 and be located between the carrier unit 14 and the base part 6.

The biasing arrangement 55 biases the carrier unit 14 and thus the carbonating head 3 away from the foundation structure 40, and thus the base part 6, towards the vertically highest position of the carbonating head 3. The distal end of the first piston rod 58a abuts against the carrier unit 14. The distal end (not shown) of the second piston rod 58b (not shown) abuts against the foundation structure 40.

More precisely, the distal end of the first piston rod 58a abuts against an upper wall 16 of the receiving space 15. In the present embodiment, the upper wall 16 comprises a through-opening for the distal end of the first piston rod 58a. The distal end of the first piston rod 58a is threaded and an internally threaded blocking structure connects the distal end of the first piston rod 58a to the through-opening such that the distal end is fixed from axial displacement in relation to the upper wall 16. The distal end of the second piston rod 58b is received in a blind-hole (not shown) in the foundation structure 40.

The invention claimed is:

1. A carbonator for carbonating a beverage in a beverage container, the carbonator comprising:
  a stationary part;
  a movable part which is movable in respect of the stationary part; and
  a guiding assembly for movably connecting the movable part and the stationary part,
  wherein the guiding assembly comprises guide rod means and guide rod engagement means, and
  wherein a first end of the guide rod means is supported by a foundation structure and a second end of the guide rod means is supported by a support structure, and wherein the foundation structure and the support structure are connected to each other by a stationary part housing of the stationary part.

2. The carbonator of claim 1, wherein the first end of the guide rod means is rigidly supported by the foundation structure in a manner not allowing displacement nor slope of the first end of the guide rod means and/or wherein the second end of the guide rod means is rigidly supported by the support structure in a manner not allowing displacement nor slope of the second end of the guide rod means.

3. The carbonator of claim 1, wherein the guide rod engagement means is attached to a carrier unit that is attached to the movable part, and wherein the carrier unit extends through an elongate opening in the stationary part housing of the stationary part.

4. The carbonator of claim 1, wherein the stationary part housing is made of metal.

5. The carbonator of claim 1, wherein the guide rod means is made of metal.

6. The carbonator of claim 1, wherein the guide rod means comprises two parallel guide rods.

7. The carbonator of claim 6, wherein the guide rod engagement means comprises slide bearings.

8. The carbonator of claim 1, wherein the guiding assembly comprises at least two guide rod engagement means and a carrier unit to which the at least two guide rod engagement means are attached.

9. The carbonator of claim 1, wherein the guiding assembly comprises a biasing arrangement for biasing the movable part towards an end position, and wherein the biasing arrangement comprises gas spring means comprising a tube body and a piston rod.

10. The carbonator of claim 9, wherein the gas spring means comprises two parallel piston rods operable in opposing directions, wherein the gas spring means is configured such that the piston rods are arranged at least partly overlapping in a compressed state of the gas spring means.

11. The carbonator of claim 10, wherein the gas spring means comprises two tube bodies, one for each piston rod, and wherein the tube bodies are arranged adjacent each other and at least partly overlapping.

12. The carbonator of claim 11, wherein each tube body comprises an attachment protrusion at both ends thereof.

13. The carbonator of claim 12, wherein the biasing arrangement comprises coupling means for attaching the tube bodies to each other by means of the attachment protrusion of the tube bodies.

14. The carbonator of claim 1, further comprising:
the movable part comprising a carbonating head comprising a dissolver nozzle for introducing carbonating medium into the beverage container;
the stationary part comprising a support part for movably supporting the carbonating head between a vertically highest position and a vertically lowest position; and
a base part connected to the support part and comprising a beverage container stand for the beverage container.

* * * * *